A. GIPPERICH.
Sight for Fire-Arms.

No. 210,115. Patented Nov. 19, 1878.

C

C

Witnesses.
Alf. L. L. Leonard
Henri Guillaume

Inventor
Adolphus Gipperich
Jr Henry Orth
atty

UNITED STATES PATENT OFFICE.

ADOLPHUS GIPPERICH, OF RICHMOND, VIRGINIA.

IMPROVEMENT IN SIGHTS FOR FIRE-ARMS.

Specification forming part of Letters Patent No. 210,115, dated November 19, 1878; application filed May 11, 1878.

*To all whom it may concern:*

Be it known that I, ADOLPHUS GIPPERICH, of the city of Richmond, in the county of Henrico and State of Virginia, have invented new and useful Improvements in Sights for Fire-Arms, of which the following is a specification:

My invention consists, principally, in mounting in the center of an open globe or skeleton sight a refractive object or substance—such as glass or jewels, or any other transparent refractive substance; and the invention further consists in grinding the front face of said substance, so as to intercept the rays of the light and refract them, whereby a bright or illuminated spot is seen upon the object aimed at.

The sights usually employed upon fire-arms are varied in form, though they involve but two principles—the open or perforated or slitted sight and the non-perforate or opaque sight. With the former the eye of the marksman sees a white or bright circle or streak around the dark center of a target, while with the opaque or solid sight the latter becomes more or less invisible upon a dark object; hence both of these are more or less uncertain. To remedy these disadvantages, and to produce for the eye a well-defined, sharp, and brilliant visual point, is the object of my invention.

Figure 3:
Figure 4:
Figure 1:
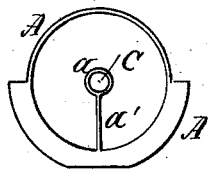
Figure 2:
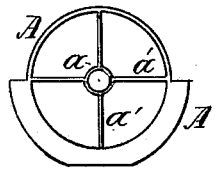

In the accompanying drawings, Figure 1 is an elevation of my improved sight for fire-arms. Fig. 2 is a similar view, showing a slight modification in the manner of mounting the diopter; and Figs. 3 and 4 illustrate the refractive object or diopter in perspective and the shape of its front face.

All the figures are drawn on an enlarged scale.

A represents the main frame of an open globe-sight or front sight for fire-arms, which may be attached to the barrel of said fire-arm in any usual or preferred manner.

By preference I insert the sight in a tube slitted to receive the same, to avoid injury to the delicate mounting or supports of the diopter or refracting substance C, which may be made of any of the better species of glass, or those species having high refractive qualities, such as crystal, crown, or flint glass; or, if desired, precious stones of good transparency, such as diamond and other similar species, may be employed.

The refractor C is mounted in a sleeve, *a*, formed upon a vertical arm, *a'*, in such manner that the refractor is exactly in the center of the sight, as shown by Fig. 1; or said refractor or diopter may be mounted in a sleeve held by four radial spokes or arms, *a'*, as shown by Fig. 2. The piece of glass or stone is made fast in the sleeve by means of cement, or in any other manner.

The arrangement of the arms *a'* is such as to obstruct the sight as little as possible, the metal being reduced to such an extent as to leave only sufficient material to support the diopter or refractor. The front face of the refractor is slightly inclined from top downward and outward, and also slightly hollowed out, as shown by Fig. 3, so that the rays of light falling on such face will be intercepted and refracted to illuminate the glass or precious stone. When thus arranged, the eye looking at a distant object will see a sharp, well-defined bright spot thereon, whether such object be of a light or a dark color, without any secondary or reflected rays of light surrounding said spot.

Although I prefer to hollow out the front face of the diopeter, and incline said face downward and outward, it is evident that by simply inclining the face of the diopter the rays of light will also be intercepted and refracted; or the outer face of the stone may be cut in any other suitable manner to effect the purpose, which is to intercept the rays of light and refract them to illuminate the diopter.

Having now described my invention, what I claim, and desire to secure by Letters Patent, is—

1. An open sight for fire-arms, having in its center a transparent refractive substance to intercept the rays of the light and refract them to illuminate said substance, substantially as and for the purpose specified.

2. In an open sight for fire-arms, a center-piece consisting of a transparent refractive substance, having one of its faces inclined at an angle to the plane of its axis, substantially as described.

3. In an open sight for fire-arms, a center-piece consisting of a transparent and refractive substance, having one of its faces inclined at an angle to the plane of its axis, and said inclined face being slightly hollowed or scooped out, substantially as and for the purpose specified.

4. An open sight for fire-arms consisting of a cylindrical frame provided with one or more radial arms and a central sleeve, held upon or supported by said arm or arms, in combination with a diopter, all arranged and operating substantially as and for the purpose specified.

In witness that I claim the foregoing I have hereunto set my hand this 9th day of May, 1878.

ADOLPHUS GIPPERICH.

Witnesses:
WILLIAM EUKER,
CHAS. T. LOEHR.